United States Patent [19]

Vandenberg

[11] 4,116,315
[45] Sep. 26, 1978

[54] LANDING GEAR ACTUATOR

[75] Inventor: Ervin K. Vandenberg, Muskegon, Mich.

[73] Assignee: Westran Corporation, Muskegon, Mich.

[21] Appl. No.: 757,305

[22] Filed: Jan. 6, 1977

[51] Int. Cl.² .......................................... F16D 41/04
[52] U.S. Cl. .................................. 192/48.92; 74/34; 74/126; 74/142; 280/766
[58] Field of Search ..................... 74/33, 34, 126, 128, 74/142; 192/48.92; 280/475, 764, 766

[56] References Cited

U.S. PATENT DOCUMENTS

| 831,974 | 9/1906 | Muller | 74/34 |
|---|---|---|---|
| 3,044,314 | 7/1962 | Klingler | 74/34 |
| 3,201,087 | 8/1965 | Dalton | 280/766 |
| 3,791,231 | 2/1974 | Geary | 74/142 |
| 4,004,830 | 1/1977 | Belke | 280/766 |

Primary Examiner—Gerald A. Dost
Attorney, Agent, or Firm—Gifford, Chandler, VanOphem, Sheridan & Sprinkle

[57] ABSTRACT

A pneumatic landing gear actuator is provided for use with an extendible and retractable landing gear assembly having an input member the rotation of which extends or retracts the landing gear foot in dependence upon the direction of rotation. The landing gear actuator includes a shaft which is drivingly connected to at least one, and preferably two, rotatable input members on two spaced landing gear assemblies. A pair of one-way clutches, each having a drive and driven member, are disposed coaxially around the shaft while a shifting gear selectively drivingly connects the driven member of one clutch or the other to the shaft. A pneumatic air cylinder can be connected to the air system of the tractor to simultaneously reciprocally rotatably drive both clutch drive members via a radial arm. Such compressed air systems are utilized for the air brakes in tractor-trailer combinations so it is readily available on most tractors for use with the present invention. The one-way clutches differ from each other in that one clutch engages only during clockwise rotation of the drive member relative to its driven member while the other clutch engages only during counterclockwise rotation of the drive member relative to its driven member. Thus, the direction of rotation of the shaft resulting from reciprocal rotation of the clutch drive members is dependent upon which of the two clutches is drivingly connected to the shaft.

11 Claims, 6 Drawing Figures

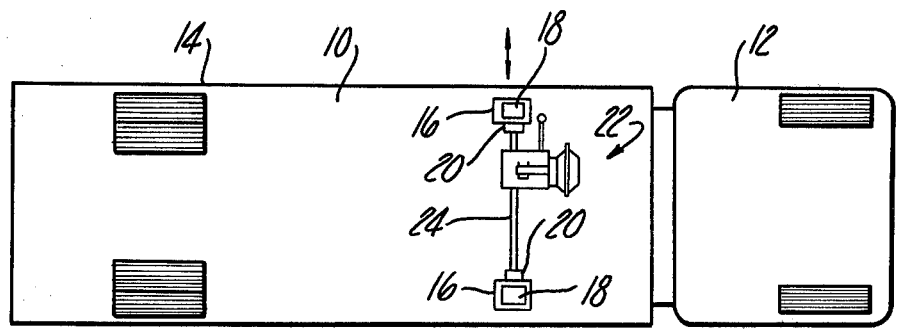
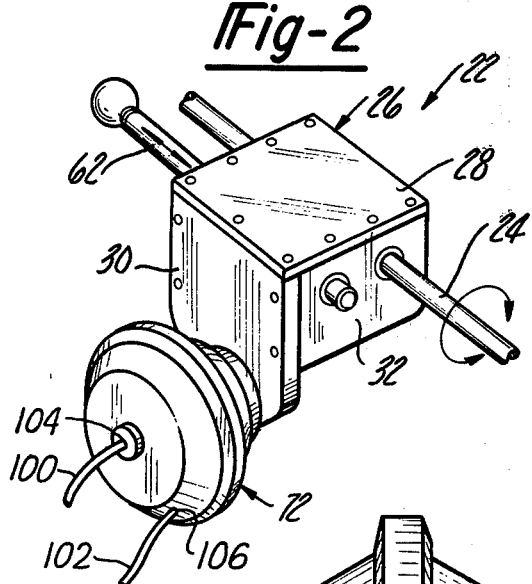
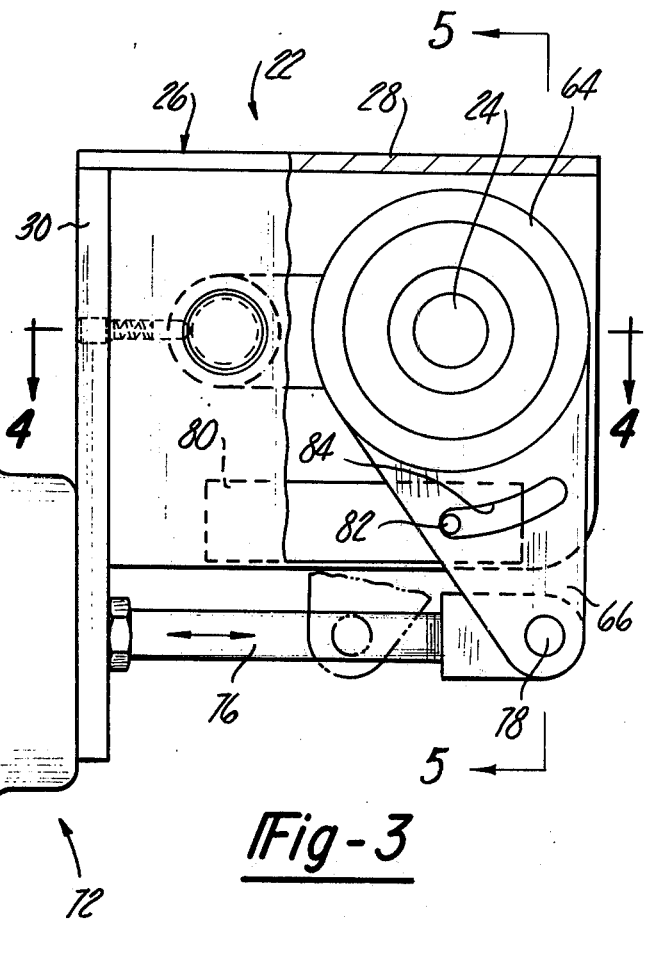

LANDING GEAR ACTUATOR

BACKGROUND OF THE INVENTION

1. Field of the Invention

The present invention relates generally to landing gear actuators and, more particularly, to a pneumatically powered landing gear actuator.

2. Description of the Prior Art

In tractor-trailer combinations, the trailer typically includes a pair of landing gear feet which extend downwardly from the bottom and near the front of the trailer. In the well known fashion, the landing gear feet contact the ground and support the trailer in an elevated position when the trailer is detached from the tractor. Conversely, when the trailer is attached to the tractor, the landing gear feet are retracted or raised from the ground to prevent interference between the ground and the landing gear feet while the trailer is being transported by the tractor.

Many of the previously known landing gear feet are both vertically extendible and retractable within landing gear assemblies attached to the bottom of the trailer. While the landing gear assemblies vary in internal design from one to another, most include a rotatable input member, the rotation of which extends or retracts the landing gear foot in dependence upon the direction of rotation of the rotatable input member.

The previously known input members are typically rotatably driven by a hand crank manually operated by the truck driver. Such hand cranks are advantageous due to their low cost, but are disadvantageous in that the hand cranks are not only time consuming in use but also tend to physically exhaust the truck driver or operator.

In order to overcome the above-mentioned disadvantages associated with manually operated hand cranks, several of the previously-known landing gear assemblies have included hydraulic motors drivingly connected with the input member of the assembly and fluidly coupled to the hydraulic system of the tractor. These previously-known hydraulic motors, however, are very expensive to construct and install in the landing gear assemblies and are also prone to failure. Moreover, such hydraulic motors require a source of hydraulic pressure which, in many cases, is unavailable. Pressurized air, on the other hand, is utilized to operate the brake systems of tractor-trailer combinations and thus a source of such air is readily available to operate the landing gear.

SUMMARY OF THE PRESENT INVENTION

The present invention overcomes the above-mentioned problems associated with the previously-known landing gear assemblies by providing a pneumatic actuator for rotatably driving the landing gear assembly input member which is not only simple and inexpensive in construction but which is also virtually fail-safe in operation. The actuator is adapted to be connected with the pneumatic system provided on tractor-trailer combinations primarily for the purpose of operating the brakes.

In brief, the landing gear actuator of the present invention includes a housing mounted on the bottom of the trailer and between the landing gear assemblies. A cross shaft extends through and is rotatably carried within the housing and is drivingly connected at each end to the respective landing gear assembly input member. Thus rotation of the shaft in one direction simultaneously and synchronously extends the landing gear feet in both landing gear assemblies downward toward the ground while the rotation of the shaft in the other direction simultaneously and synchronously retracts both of the landing gear feet into their respective landing gear assembly.

A pair of one-way clutches, each including a drive member and a driven member, are coaxially mounted around the cross shaft within the actuator housing. A shifting gear is axially slidably mounted around the shaft within the actuator housing and is movable between a first and a second position by a shifting yoke. In its first position, the shifting gear drivingly connects the driven member of one clutch with the cross shaft while in its second position the shifting gear drivingly connects the driven member of the other clutch with the cross shaft.

Each of the clutch drive members are simultaneously and reciprocally rotatably driven by a reciprocating pneumatic piston connected to the clutch drive members via a radial arm. The piston is actuated through a valve connecting the actuator with the pneumatic system of the tractor-trailer.

The one-way clutches differ from each other in that the drive member of one clutch engages its driven member only during clockwise rotation of the drive member relative to its driven member. Conversely, the drive member of the other clutch drivingly engages its driven member only during counterclockwise rotation of the drive member relative to its driven member. Consequently, with the shifting gear connecting the first clutch driven member with the cross shaft, reciprocal rotation of the clutch drive members rotatably drives the cross shaft in a clockwise direction. Conversely, with the shifting gear connecting the second clutch driven member with the cross shaft, reciprocal rotational movement of the clutch drive members rotatably drives the cross shaft in the counterclockwise direction. Rotation of the cross shaft in a clockwise (or counterclockwise) direction extends the landing gear feet from the landing gear assemblies and vice versa.

As will be hereinafter described in greater detail, the landing gear actuator of the present invention is of simple and relatively inexpensive construction. Moreover, due in part to its simplicity, the landing gear actuator is virtually fail-safe in operation.

BRIEF DESCRIPTION OF THE DRAWINGS

A better understanding of the present invention will be had upon reference to the following detailed description when read in conjunction with the accompanying drawings wherein like reference characters refer to like parts throughout the several views, and in which:

FIG. 1 is a bottom diagrammatic view illustrating the actuator of the present invention installed upon a trailer;

FIG. 2 is a perspective view illustrating the actuator of the present invention;

FIG. 3 is a partial cross-sectional side view of the actuator of the present invention;

DETAILED DESCRIPTION OF THE PRESENT INVENTION

Figure 4:
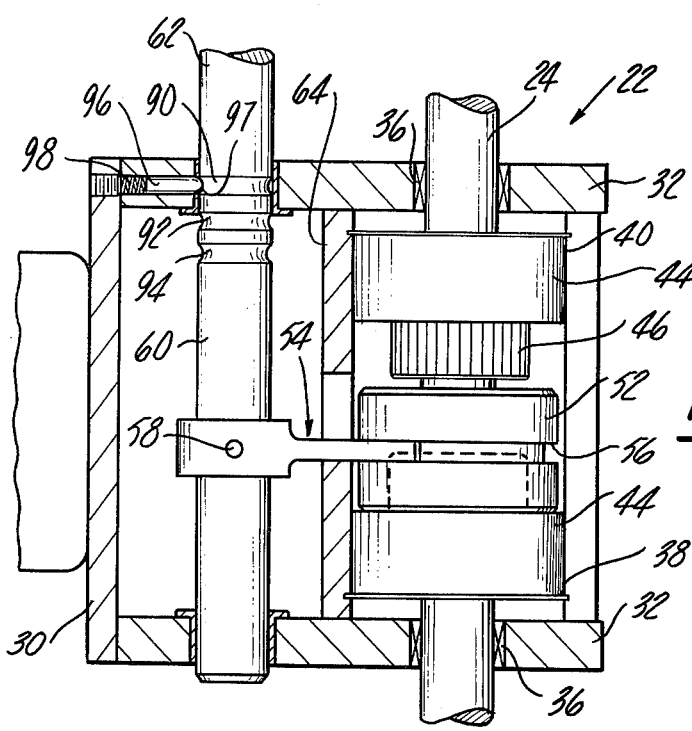
FIG. 4 is a fragmentary sectional view of the actuator of the present invention taken substantially along line 4—4 of FIG. 3.

With reference first to FIG. 1, the bottom of a trailer 10 and tractor 12 are thereshown. The trailer 10 includes rear wheels 14 and a pair of laterally spaced landing gear assemblies 16 near the front of the trailer 10. The landing gear assemblies 16 are of conventional construction and include a landing gear foot 18 which can be extended from and retracted into its respective landing gear assembly 16. A rotatable member 20, which may take any of several forms, is associated with each landing gear assembly 16 such that rotation of the rotatable member 20 extends or retracts the landing gear feet 18 in dependence upon the direction of rotation of the member 20. This is conventional in landing gear assemblies presently in use.

Still referring to FIG. 1, a landing gear actuator 22 is positioned between the landing gear assemblies 16 and is preferably secured to the bottom of the trailer 10. A cross shaft 24 extends through and is rotatably carried by the actuator 22 (as will be later described) and is drivingly connected at each end to one of the rotatable members 20 on the landing gear assemblies 16. Consequently, rotation of the shaft 24 in one rotational direction simultaneously and synchronously extends the landing gear feet 18 from the landing gear assemblies 16. Conversely, rotation of the shaft 24 in the opposite direction simultaneously and synchronously retracts each landing gear foot 18 into its respective landing gear assembly 16.

With reference to FIGS. 2-5, the actuator 22 of the present invention is thereshown in greater detail and includes a housing 26 having a top plate 28, front plate 30, and side plates 32. The housing top plate 28 is preferably attached to the bottom of the trailer 10 by any appropriate means while the shaft 24 extends through registering bores 34 in the side plates 32. Preferably, appropriate bearing means 36 are positioned between each of the bores 34 and the shaft 24.

Figure 5:
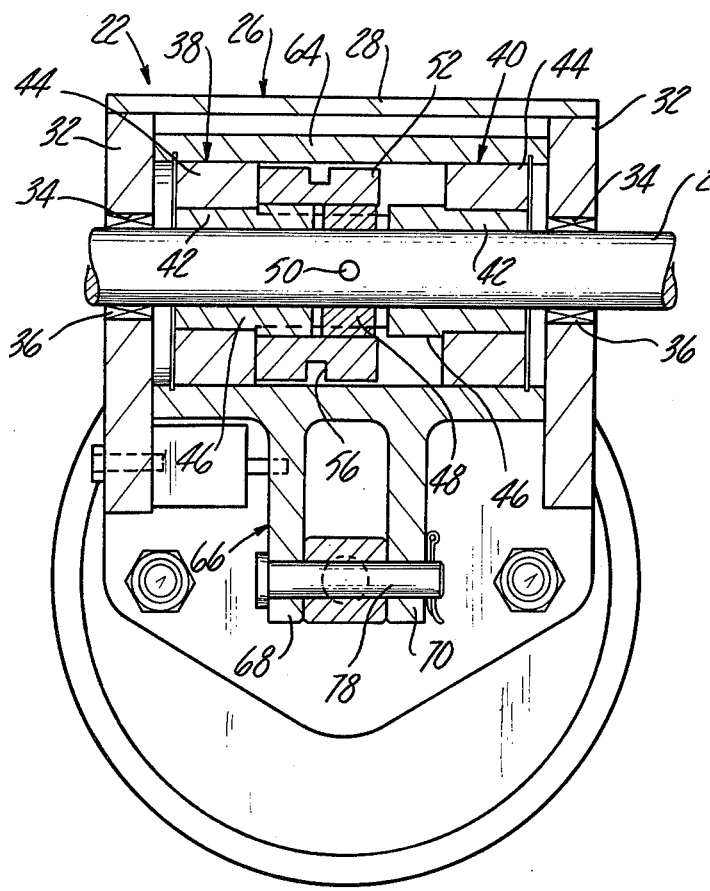
FIG. 5 is a sectional view of the actuator of the present invention taken substantially along line 5—5 of FIG. 3.

As best shown in FIGS. 4 and 5, a first and second one-way clutch 38 and 40, respectively, are provided within the housing 26. Each clutch 38 and 40 includes an inner annular driven member 42 (FIG. 5) which is coaxially and slidably disposed around the shaft 24. An outer annular drive member 44 is disposed around each driven member 42 and drivingly engages its respective driven member 42 upon rotation of the drive member 44 in one rotational direction only.

The one-way clutches 38 and 40 can be substantially identical to each other and are preferably what is known in the trade as a Sprague clutch. However, as positioned around the shaft 24, the clutches 38 and 40 are in a facing relationship so that with rotation of the clutch drive members 44 in one rotational direction, only one of the clutches 38 or 40 will drivingly engage its driven member 42. Likewise, with the opposite rotation of the clutch drive members 44, only the other clutch drive member 44, will engage its driven member 42.

Still referring to FIGS. 4 and 5, each of the clutch driven members 42 includes an axially protruding externally splined portion 46 so that the splined portions 46 face, but are axially spaced from each other. An externally splined gear 48 (FIG. 5) is positioned around and is attached to the shaft 24 intermediate the splined portions 46 by a roll pin 50 or the like. The splined portions 46 and the gear 48 are of substantially the same diameter.

An internally splined annular shifting gear 52 is disposed around the gear 48 so that the internal splines of the shifting gear 52 mesh with the external splines of the gear 48. In addition, the axial length of the shifting gear 52 is such that the internal splines of the gear 52 mesh with at least one of the splined portions 46 of one of the driven members 42. For example, as shown in FIG. 5, the shifting gear 52 meshes with the splined portion 46 of the first clutch driven member 42 in addition to the gear 48. However, the shifting gear 52 can be slid rightward from the position shown in FIG. 5 so that its internal splines mesh with the splined portion 46 of the second clutch 40 in addition to the gear 48. Since the gear 48 is coupled to the shaft 24 by the pin 50, it is therefore seen that the driven member 42 of either clutch 38 or 40 can be drivingly connected to the shaft 24.

With reference to FIG. 4, the means for axially shifting the gear 52 is thereshown and comprises a yoke 54 which is slidably received within an annular recess 56 formed around the outer periphery of the gear 52. The yoke 54 is connected by a pin 58 to a shifting rod 60 having a portion 62 which extends outwardly from the actuator housing 26. The shifting rod 60 can be manually axially moved which, in turn, axially shifts the gear 52 via the yoke 54.

With reference now to FIGS. 3-5, a tube 64 within the housing 26 is coaxially positioned around the clutches 38 and 40. The tube 64 is secured to the drive member 44 of both clutches 38 and 40 so that rotation of the tube 64 simultaneously and synchronously rotates both of the clutch drive members 44.

In addition, as can best be seen in FIGS. 3 and 5, a radial arm 66, preferably formed integrally with the tube 64 and comprising a pair of spaced plates 68 and 70, extends radially outwardly and downwardly from the tube 64.

As best seen in FIG. 3, a pneumatic actuator 72 includes a housing 74 which is secured to the front plate 30. A piston rod 76 is coupled at its inner end to the actuator housing 74 and at its outwardly extending end to the radial arm 66 by means of a pivot pin 78. The pneumatic actuator 72 is operable, upon activation to axially extend and retract the piston rod 76. Consequently, retraction of the piston rod 76 into the housing 74 rotates the arm 66 and attached tube 64 in a clockwise direction to the position shown in phantom line (FIG. 3). Conversely, extension of the piston rod 76 from its retracted position to its extended position rotates the radial arm 66 and the attached tube 64 in a counterclockwise direction to the position shown in solid lines in FIG. 3.

Still referring to FIG. 3, a valve switch 80 having an actuator button 82 positioned within an arcuate slot 84 in the arm 66, is actuated at both the outermost extension and innermost retraction of the piston rod 76. The switch 80 controls the pneumatic actuator 72 by any conventional means (not shown) so that the piston rod 76 reciprocates linearly between the positions shown in phantom and solid line. Any other appropriate means, of course, can also be used to control the pneumatic actuator 72 so that the piston rod 76 continuously linearly reciprocates.

The operation of the actuator 22 of the present invention can now be described. With the shifting gear 52 in the axial position shown in FIGS. 4 and 5 and with the pneumatic actuator 72 linearly reciprocating the piston rod 76, the tube 64 and hence both clutch drive members are alternately and repeatedly rotated in a clockwise and counterclockwise direction through a relatively small arc, similarly to a ratchet mechanism. During this time, the driven member 42 of only one clutch 38 is drivingly connected to the shaft 24 via the shifting gear 52 and the splined gear 48. The first clutch drive member 44 engages its driven member 42 only during, for example, clockwise rotation (viewed from FIG. 3) so that the clutch 38 rotatably drives the shaft 24 in a clockwise direction during retraction of the piston rod 76 from its outermost to its innermost position. During extension of the piston rod 76 from its innermost to its outermost position, however, the clutch 38 slips or disengages so that no rotational movement is imparted to the shaft 24 from the clutch 38.

Assume now that the shifting gear 52 is axially repositioned by the shifting rod 60 so that the clutch 40, rather than the clutch 38, is drivingly connected to the shaft 24. In this event the clutch 40 engages only during counterclockwise rotation of the drive member 44 relative to its driven member 42 (as viewed from FIG. 3). In other words, the clutch 40 engages only during extension of the piston rod 76 from its innermost to outermost position. In contrast to the first clutch 38, the clutch 40 slips or is disengaged as the piston rod 76 moves from its outermost to innermost position. Consequently, the shaft 24 is driven in a counterclockwise direction.

From the foregoing it can be seen that the linearly reciprocating motion of the piston rod 76 rotatably drives the shaft 24 wherein the direction of rotation of the shaft 24 is dependent upon the axial position of the shifting gear 52. Rotation of the shaft 24 in one direction, of course, raises the landing gear feet 18 while rotation in the other direction extends or lowers the landing gear feet 18.

Figure 6:
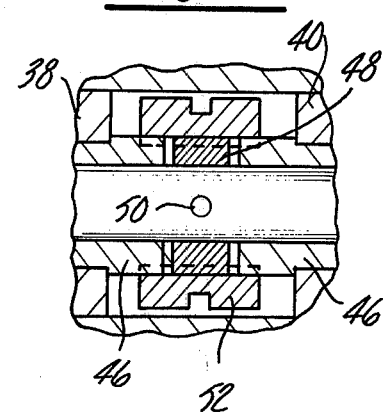
FIG. 6 is a fragmentary sectional view illustrating a portion of the actuator of the present invention.

With reference now to FIGS. 4 and 6, in order to ensure the proper positioning of the shifting rod 60 and, hence, the shifting gear 52, preferably the rod includes three sequential annular grooves 90, 92, and 94 (FIG. 4) around its periphery. A pin 96 having a rounded head 97 is carried within one of the housing side plates 32 and is urged against the rod 60 by a spring 98. The head 97 of the pin 96 is received within one of the grooves 90–94 to thereby prevent unintended axial movement of the rod 60. Thus, as the pin engages the groove 90, the shifting gear 52 is axially positioned and connects the first clutch 38 with the shaft 24. As the rod 60 is moved outwardly from the house so that the pin 96 engages the annular groove 94, the position of the shifting gear 52 axially moves so that the second clutch 40 is drivingly connected to the shaft 44. Lastly, as the pin 96 is received within the central groove 92, the shifting gear 52 assumes the position shown in FIG. 6 in which the shifting gear 52 overlaps a portion of both clutch driven members 42 in addition to the splined member 48. In this position, the shaft 24 is effectively locked against rotation due to the locking engagement of one of the clutchs 38 and 40 regardless of the direction of rotation of the shaft 24.

The actuator 74 is preferably connected to a suitable pneumatic system such as that commonly provided on tractors to actuate the brake system. Suitable conduits 100, 102 (FIG. 2) connect to ports 104, 106 provided for this purpose on the actuator.

From the foregoing, it can be seen that the landing gear actuator 22 of the present invention provides a unique ratchet actuator. Moreover, while the piston rod 26 is preferably pneumatically driven, other means to linearly reciprocably drive the piston rod can also be used while remaining within the scope of the invention. Additionally, the actuator 22 of the present invention is not only of simple and inexpensive construction, but is virtually fail-safe in operation due in part to its simplicity of construction.

Having described my invention, many modifications thereto will become apparent to those skilled in the art to which it pertains without deviating from the spirit of the invention and defined by the scope of the appended claims.

I claim:

1. For use with a landing gear assembly having an extendable and retractable foot and an input member the rotation of which extends or retracts the foot in dependence upon the direction of rotation of said member, a landing gear actuator comprising:

a rotatable member drivingly connected with said input member;

a one-way clutch having a driven member and a drive member, said driven member being rotatably positioned around said rotatable member;

means for selectively drivingly connecting said driven member with said rotatable member, said means comprising an annular member fixedly attached to the rotatable member at a position axially spaced from the driven member, and a shifting gear disposed around said annular member and fixed against rotation with respect to the annular member, said shifting gear being axially movable between a position in which said shifting gear rotatably drivingly connects the driven member with the annular member and a further position in which the shifting gear is out of engagement with the driven member; and means for reciprocally rotatably driving said clutch drive member.

2. The invention as defined in claim 1 and further including a second one-way clutch having a drive member and a driven member, and means for selectively drivingly connecting the driven member of one of said clutches with said rotatable member wherein said clutches engage in opposite rotational directions.

3. The invention as defined in claim 2 wherein the driven members of said clutches are slidably disposed around said rotatable member in an axially spaced relationship, said annular member being attached to said rotatable member between said driven members, said shifting gear being disposed around said rotatable member and movable between a first and a second axial position wherein in said first position said shifting gear drivingly connects one of said driven members with said annular member and wherein in said second position said shifting gear drivingly connects the other driven member with said annular member, and means for axially shifting said shifting gear between said first and second axial positions.

4. The invention as defined in claim 3 wherein said shifting means comprises a yoke slidably received in a recess formed in said shifting gear and a handle means connected to said yoke for axially shifting said yoke.

5. The invention as defined in claim 3 wherein each of said clutches is a Sprague clutch.

6. The invention as defined in claim 1 wherein said reciprocal driving means further comprises an arm member attached to and extending radially outwardly from said clutch drive member, an elongated piston rod pivotally attached at one end to the outwardly extending end of said arm member, and means for linearly, reciprocally driving said piston rod whereby said clutch drive member is reciprocally rotatably driven.

7. The invention as defined in claim 6 wherein said last mentioned means comprises a reciprocating pneumatic actuator.

8. The invention as defined in claim 6 and including a second one-way clutch having a drive member and driven member and means for selectively drivingly connecting the driven member of one of said clutches with said rotatable member wherein said clutches engage in opposite rotational directions.

9. The invention as defined in claim 8 wherein said arm member is attached to both of said clutch drive members.

10. The invention as defined in claim 9 wherein said clutch drive members are coaxial and said arm member includes a tube encompassing and attached to the drive members.

11. The invention as defined in claim 3 and including means for positioning said shifting gear substantially midway between said shifting gear axial positions so that said shifting gear drivingly connects both clutch driven members with said rotatable member to thereby lock said rotatable member against rotation.

* * * * *